United States Patent
Michiki et al.

[19]
[11] Patent Number: 6,041,272
[45] Date of Patent: Mar. 21, 2000

[54] DESULFURIZATION PROCESS FOR FLUE GASES

[75] Inventors: Hideyuki Michiki; Hisashi Miyakawa; Kozo Ohsaki, all of Chiba, Japan

[73] Assignee: Toyo Engineering Corporation, Tokyo, Japan

[21] Appl. No.: 09/097,114

[22] Filed: Jun. 12, 1998

[30] Foreign Application Priority Data

Jun. 24, 1997 [JP] Japan ................................... 9-167469
Mar. 19, 1998 [JP] Japan ................................... 10-070335

[51] Int. Cl.⁷ ........................................... G05B 1/00
[52] U.S. Cl. .............. 700/266; 423/243.01; 423/243.08; 423/DIG. 5; 422/105; 700/282
[58] Field of Search ................... 423/243.08, 243.01, 423/DIG. 5; 422/105; 700/266

[56] References Cited

U.S. PATENT DOCUMENTS

| | | | |
|---|---|---|---|
| 3,897,540 | 7/1975 | Onnen ............................ | 423/242 |
| 4,193,971 | 3/1980 | Kawamata et al. ............... | 423/242 |
| 5,039,499 | 8/1991 | Stowe, Jr. ...................... | 423/242 |
| 5,676,915 | 10/1997 | Iiyama et al. .................. | 423/243.01 |
| 5,757,660 | 5/1998 | Musow ........................... | 364/500 |

FOREIGN PATENT DOCUMENTS

| | | | |
|---|---|---|---|
| 0 339 683 A2 | 11/1989 | European Pat. Off. .......... | 423/243.08 |
| 52-76273 | 6/1977 | Japan ........................... | 423/243.08 |
| 8-155263 | 6/1996 | Japan . | |

Primary Examiner—Steven P. Griffin
Assistant Examiner—Timothy C Vanoy
Attorney, Agent, or Firm—Knobbe, Martens, Olson & Bear, LLP

[57] ABSTRACT

Formation of calcium sulfite in a desulfurization column for desulfurizing flue gas is prevented by maintaining the pH of the sorption liquid in the column in the range of 5.5–7.0 and the chemical oxygen demand of the sorption liquid below an upper value determined by the concentration of magnesium sulfate. The upper value of the chemical oxygen demand of the sorption liquid can be controlled by maintaining the quantity of magnesium sulfate in an oxidization vessel arranged downstream of the desulfurization column. The oxidized liquid discharged from the oxidization vessel is neutralized in a double composition vessel, and the thus-obtained slurry is returned directly to the desulfurization column. By preventing formation of calcium sulfite, high-quality gypsum is formed in the double composition vessel.

16 Claims, 8 Drawing Sheets

DESULFURIZATION PROCESS FOR FLUE GASES

BACKGROUND OF THE INVENTION

1. Field of the Invention

The invention relates to a desulfurization technology for a variety of flue gases containing sulfur compounds, such as exhaust gases from combustion of heavy oil, coal and the like.

2. Description of the Related Art

As a desulfurization process for various flue gases, it is known to use magnesium components such as magnesium hydroxide and light burned magnesium oxide as a desulfurizing agent.

(1) In this process, a flue gas is first brought into contact with an absorbing liquid containing the aforesaid desulfurizing agent in a desulfurization step to cause the liquid to absorb sulfur dioxide, and the resulting absorbing liquid is treated with an oxygen-containing gas to convert magnesium salts contained therein to an aqueous solution of magnesium sulfate and sulfuric acid, the aqueous solution being then neutralized with magnesium components. The aqueous solution of magnesium sulfate after the neutralization is discharged to the sea as it is. This leads to consumption of magnesium components and sometimes requests consideration of the influence on the environment.

Figure 7:
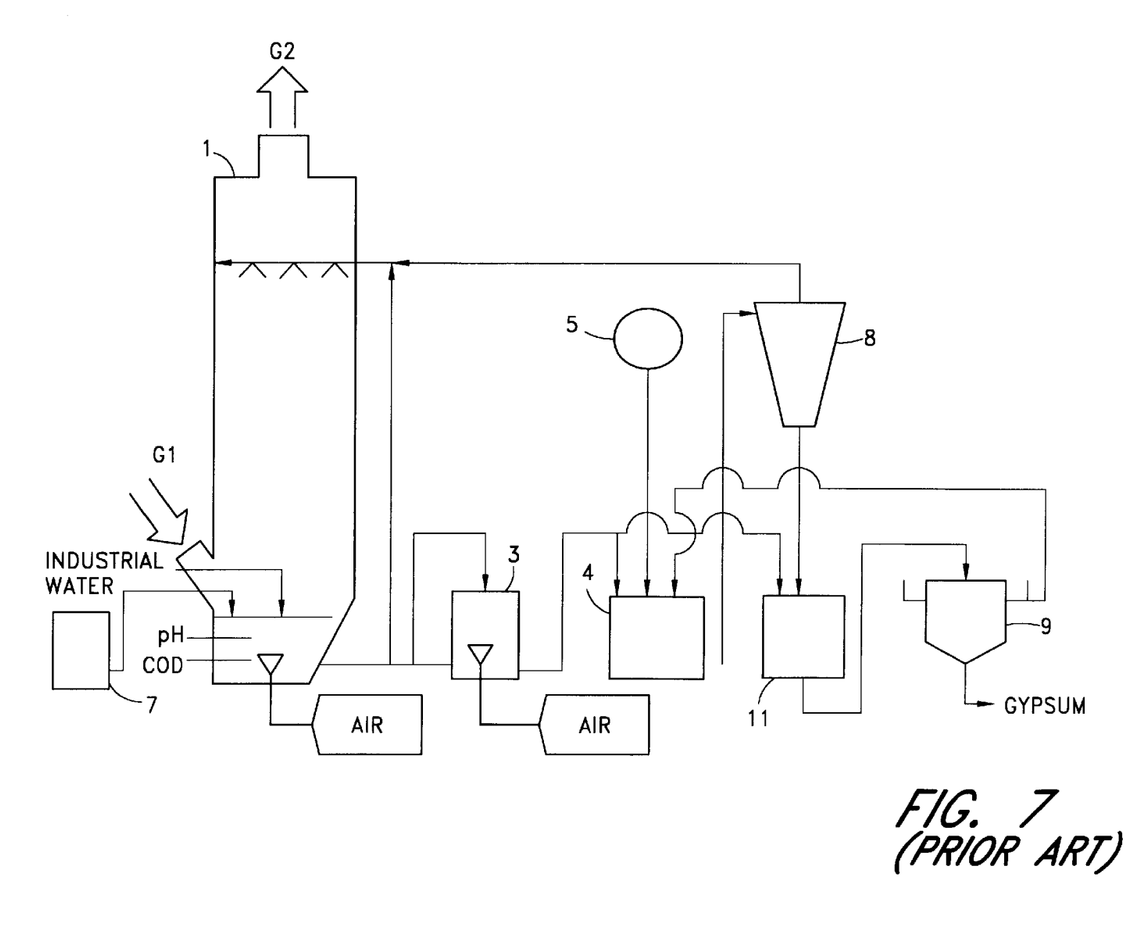
FIG. 7 is a drawing illustrating an example of the prior art.

(2) Separately, the following process is disclosed in Japanese Patent Laid-Open No. 155263/1996 as another conventional technique in which the aqueous magnesium sulfate solution is not discharged. Namely, as shown in FIG. 7, an aqueous solution of magnesium sulfate formed in an oxidation vessel 3 is introduced into a double decomposition vessel 4 where calcium hydroxide, quick lime or the like is added to the aqueous solution to react it with the magnesium sulfate, forming gypsum and magnesium hydroxide. The mixture of these compounds is separated into a fine particle slurry comprising primarily magnesium hydroxide and a coarse particle slurry comprising primarily gypsum in an wet separator 8. The former fine particle slurry thus separated is recycled to a desulfurization column 1 as a desulfurizing agent, and a small quantity of accompanying magnesium hydroxide in the latter coarse particle slurry is treated with sulfuric acid, or with sulfuric acid formed by the oxidation of a desulfurization-step-treated liquid, or with a desulfurization-step-treated liquid while blowing air therein to convert the magnesium hydroxide to magnesium sulfate. Insoluble gypsum is separated from the slurry comprising magnesium sulfate and gypsum in a settler 9, and the aqueous magnesium sulfate solution is recirculated to the double decomposition vessel 4 for treatment.

Figure 8:
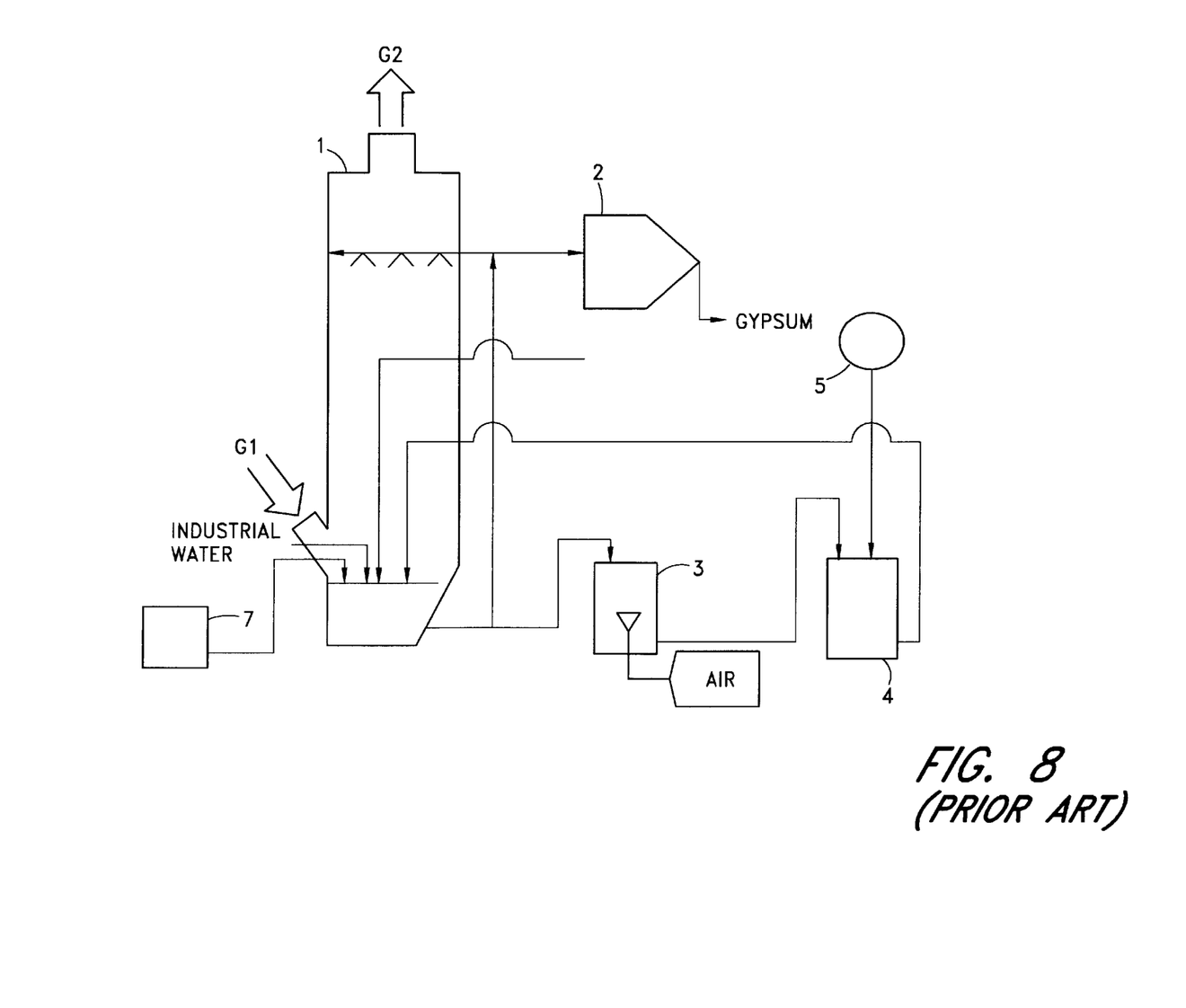
FIG. 8 is a drawing illustrating another example of the prior art.

(3) Where the mixture of gypsum and magnesium hydroxide formed in the double decomposition vesel 4 is separated into the two components by the above-described process (2), it is difficult to increase the separation efficiency due to solid/solid separation. Therefore, as shown in FIG. 8, the mixture is returned to a desulfurization column 1 without separating magnesium hydroxide from gypsum, and the magnesium hydroxide contained therein is used as a desulfurizing agent to react it with sulfur dioxide and convert it to magnesium sulfite, magnesium bisulfite and magnesium sulfate. The resulting desulfurization-step-treated liquid is sent to a gypsum separator 2 to separate insoluble gypsum by filtration. Alternatively, although not shown in FIG. 8, magnesium sulfite and magnesium bisulfite contained in the desulfurization-step-treated liquid are converted to water-soluble magnesium sulfate in an oxidation vessel 3, and the oxidation-vessel-treated liquid is sent to a gypsum separator 2 to separate insoluble gypsum by filtration.

The problem of separating solid particles into fine particles and coarse particles is solved by the above-described process (3). However, since magnesium hydroxide and gypsum are returned to the desulfurization column 1 in a mixed state, it is possible that calcium ions reacts with sulfite ions to form insoluble calcium sulfite depending on the conditions in the desulfurization column. The formation of calcium sulfite obstructs the crystallinity of gypsum, so that it not only makes difficult isolation of gypsum formed but also deteriorates the quality of the gypsum thus obtained.

SUMMARY OF THE INVENTION

In a desulfurization process in which gypsum and magnesium hydroxide formed in a double decomposition step are not separated from each other but recycled to a desulfurization step, an object of the present invention is to provide an improved desulfurization process which can suppress the formation of calcium sulfite, improve the quality of by-produced gypsum, at the same time facilitate the separation of gypsum formed, and make a stable operation possible.

The present inventors have found that (a) a gypsum product of excellent quality is by-produced by maintaining the pH of a desulfurization-step-absorbing liquid in a fixed range, maintaining the amount of magnesium sulfate in the liquid to be constant, and maintaining the chemical oxygen demand of the liquid in the range not exceeding its upper limit value determined by the concentration of magnesium sulfate in the absorbing liquid, (b) a gypsum product of excellent quality is by-produced by separating fine slurry from a treated liquid of the desulfurization step and then subjecting the fine surry to oxidation to oxidize efficiently and reduce accompanying calcium sulfite to the extent that the amount of calcium sulfite in the gypsum product may be neglected, and separatly (c) gypsum of excellent quality is by-produced by separating markedly-grown gypsum in a gypsum separation step and sending the remaining fine crystals to the double decomposition vessel as seed crystals. The present invention has been completed on the basis of these findings. Hereinafter, inventions relating to (a) (the following (1)–(4), (8), and (9)) are sometimes referred to as a first invention, inventions relating to (b) (the following (5), (8), and (9)) as a second invention, and inventions relating to (c) (the following (6)–(9)) as a third invention.

(1) A desulfurization process for a flue gas which comprises a desulfurization step, in which a flue gas containing sulfur dioxide is brought into contact with an absorbing liquid containing a magnesium components so that the sulfur dioxide contained in the flue gas are absorbed and removed, and an oxidation step, in which a treated liquid from the desulfurization step is treated with an oxygen-containing gas, and a double decomposition step, in which a treated liquid from said oxidation step is reacted with a basic calcium compound, a slurry from the double decomposition step containing magnesium hydroxide regenerated in the double decomposition step being recycled to the desulfurization step and/or the oxidation step in the state of containing gypsum, and which further comprises a gypsum separation step, in which gypsum is taken out from a treated liquid from the desulfurization step and/or oxidation step, wherein the present values of pH and magnesium sulfate concentration of the desulfurization-step-absorbing liquid are measured, the expected values of pH and magnesium sulfate concentration of the desulfurization-step-absorbing liquid after a lapse of a definite time being calculated from the amounts and compositions of substances introduced into the desulfurization step and the amounts and compositions of substances discharged from the desulfurization step, and the pH and magnesium sulfate concentration of the desulfurrization-step-absorbing liquid are maintained constant by using any of the following methods in accordance with the differences between the present values and the expected values:

1) to regulate the amount of the slurry sent from the oxidation step to the double decomposition step,
2) to regulate the amount of the slurry recycled from the double decomposition step to the desulfurization step and/or the oxidation step,
3) to regulate the amount of magnesium hydroxide supplemented to the desulfurization step, and
4) to use jointly any two or all of the aforesaid methods.

(2) A desulfurization process for a flue gas which comprises a desulfurization step, in which a flue gas containing sulfur dioxide is brought into contact with an absorbing liquid containing a magnesium components so that the sulfur dioxide contained in the flue gas are absorbed and removed, and an oxidation step, in which a treated liquid from the desulfurization step is treated with an oxygen-containing gas, and a double decomposition step, in which a treated liquid from said oxidation step is reacted with a basic calcium compound, a slurry from the double decomposition step containing magnesium hydroxide regenerated in the double decomposition step being recycled to the desulfurizations step and/or oxidation step in the state of containing gypsum, and which further comprises a gypsum separation step, in which gypsum is taken out from a treated liquid from the desulfurization step and/or oxidation step, wherein the pH of the desulfurization-step-absorbing liquid is maintained in the range of 5.5–7.0 and the chemical oxygen demand thereof is maintained in the range not exceeding its upper limit value determined by the concentration of magnesium sulfate in the absorbing liquid.

(3) The desulfurization process for a flue gas as described in the above item (2) wherein the pH and chemical oxygen demand of the desulfurization-step-absorbing liquid are measured continuously or periodically, and the pH of the desulfurization-step-absorbing liquid is maintained in the range of 5.5–7.0 and the chemical oxygen demand thereof is maintained in the range not exceeding its upper limit value determined by the concentration of magnesium sulfate in the desulfurization-step-absorbing liquid by using any of the following methods in accordance with the amounts and compositions of substances introduced into the desulfurization step and the amounts and compositions of substances discharged from the desulfurization step:

1) to install a device for blowing an oxygen-containing gas into the desulfurization-step-treated liquid to regulate the amount of the gas blown therein,
2) to recycle a part of the oxidation-step-treated liquid to the desulfurization step, and
3) to use jointly the above-described methods 1) and 2).

(4) The desulfurization process for a flue gas as described in the above item (3) wherein the present values of pH and chemical oxygen demand of the desulfurization-step-absorbing liquid are measured and the expected values of pH and chemical oxygen demand of the desulfurization-step-absorbing liquid after a lapse of a definite time are calculated from the amounts and compositions of substances introduced into the desulfurization step and the amounts and compositions of substances discharged from the desulfurization step, the pH of the desulfurization-step-absorbing liquid being maintained in the range of 5.5–7.0 and the chemical oxygen demand thereof being maintained in the range not exceeding its upper limit value determined by the concentration of magnesium sulfate in the desulfurization-step-absorbing liquid by using any of the following methods in accordance with the differences between the present values and the expected values:

1) to install a device for blowing an oxygen-containing gas into the desulfurization-step-treated liquid to regulate the amount of the gas blown therein,
2) to recycle a part of the oxidation-step-treated liquid to the desulfurization step, and
3) to use jointly the above-described methods 1) and 2).

(5) A desulfurization process for a flue gas which comprises a desulfurization step, in which a flue gas containing sulfur dioxide is brought into contact with an absorbing liquid containing a magnesium components so that the sulfur dioxide contained in the flue gas are absorbed and removed, and an oxidation step, in which a treated liquid from the desulfurization step is treated with an oxygen-containing gas, and a double decomposition step, in which a treated liquid from said oxidation step is reacted with a basic calcium compound, a slurry from the double decomposition step containing magnesium hydroxide regenerated in the double decomposition step being recycled to the desulfurization step and/or oxidation step in the state of containing gypsum, wherein a part of a treated liquid from the desulfurization step is separated into a coarse particle slurry and a fine particle slurry in a wet separator, said fine particle slurry being divided into two parts, one being recycled to the desulfurization step, while the other to a second oxidation step provided separately from said oxidation step, and a treated liquid from said second oxidation step, combined with the coarse particle slurry from said wet separator, is sent to a gypsum separator where gypsum is separated and the remaining liquid is returned to the desulfurization step.

(6) The desulfurization process for a flue gas as described in the above items (1) to (5) wherein the amount of gypsum in the slurry sent to the double decomposition step is from 20% to 80% based on the gypsum formed in the double decomposition step.

(7) The desulfurization process for a flue gas as described in the above item (6) wherein the amount of gypsum taken out in the gypsum separation step from the desulfurization-step-treated and/or oxidation-step-treated liquid is controlled to requlate the concentration of gypsum in the slurry sent to the double decomposition step.

(8) The desulfurization process for a flue gas as described in any one of the above items (1) to (7) wherein a calcium ion removing step is provided after said double decomposition step, and a part of the oxidation-step-treated liquid is added there to the mixed slurry of gypsum dihydrate and magnesium hydroxide regenerated in the double decomposition step to reduce the concentration of calcium ions in said mixed slurry by magnesium sulfate contained in the treated liquid, the resulting mixture being returned to the desulfurization step and/or oxidation step.

(9) The desulfurization process for a flue gas as described in any one of the above items (1) to (8) wherein said desulfurization step and oxidation step are carried out in one equipment.

DESCRIPTION OF THE CODES 1. desulfurization column
2. gypsum separator
3. oxidation vessel
4. double decomposition vessel
5. calcium hydroxide feed tank
6. calcium ion removing vessel
7. magnesium hydroxide slurry feed tank
8. wet separator
9. settler
10. second oxidation vessel
G1. flue gas
G2. treated gas

DESCRIPTION OF THE PREFERRED EMBODIMENTS

In the following, the first invention is described on the basis of FIGS. 1–5 illustrating embodiments of the first invention.

Figure 1:
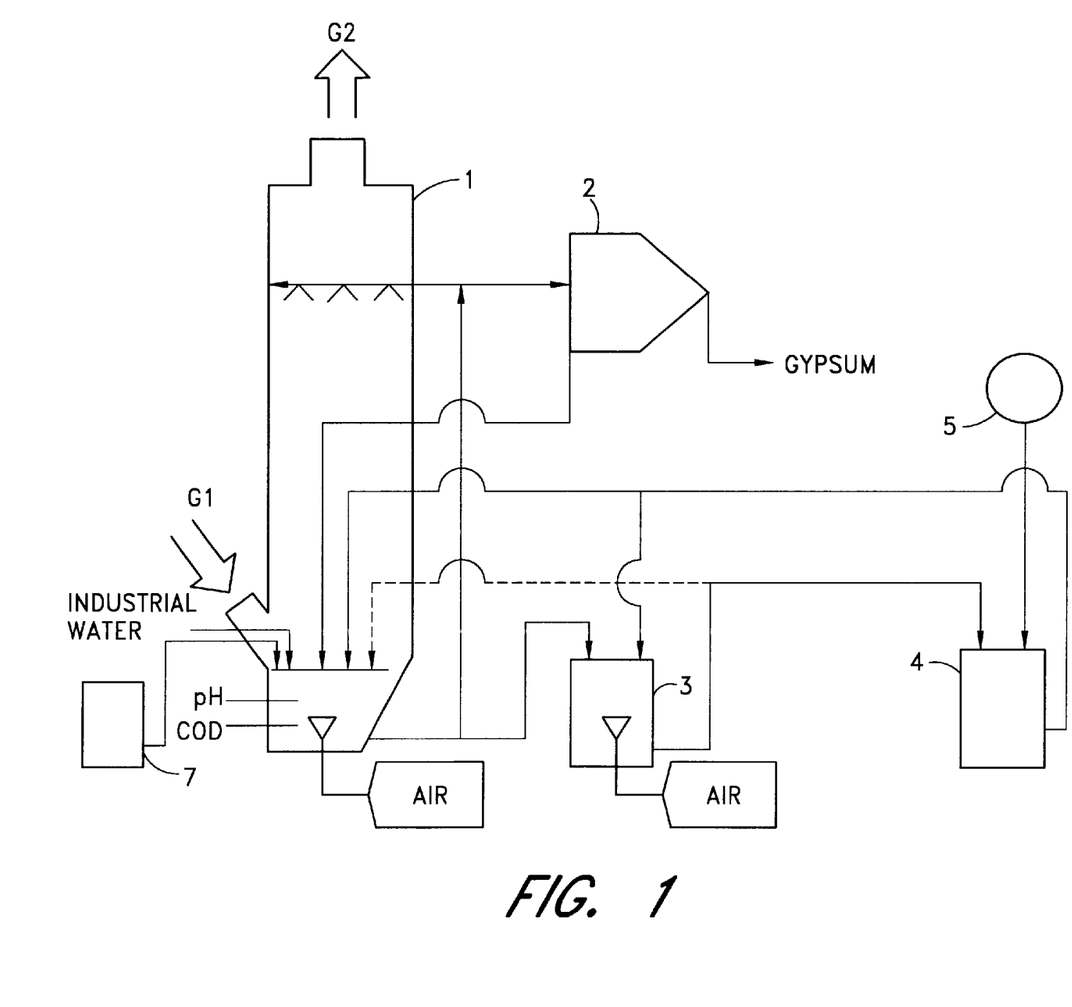
FIG. 1 is a drawing illustrating an example of the present invention.
Figure 2:
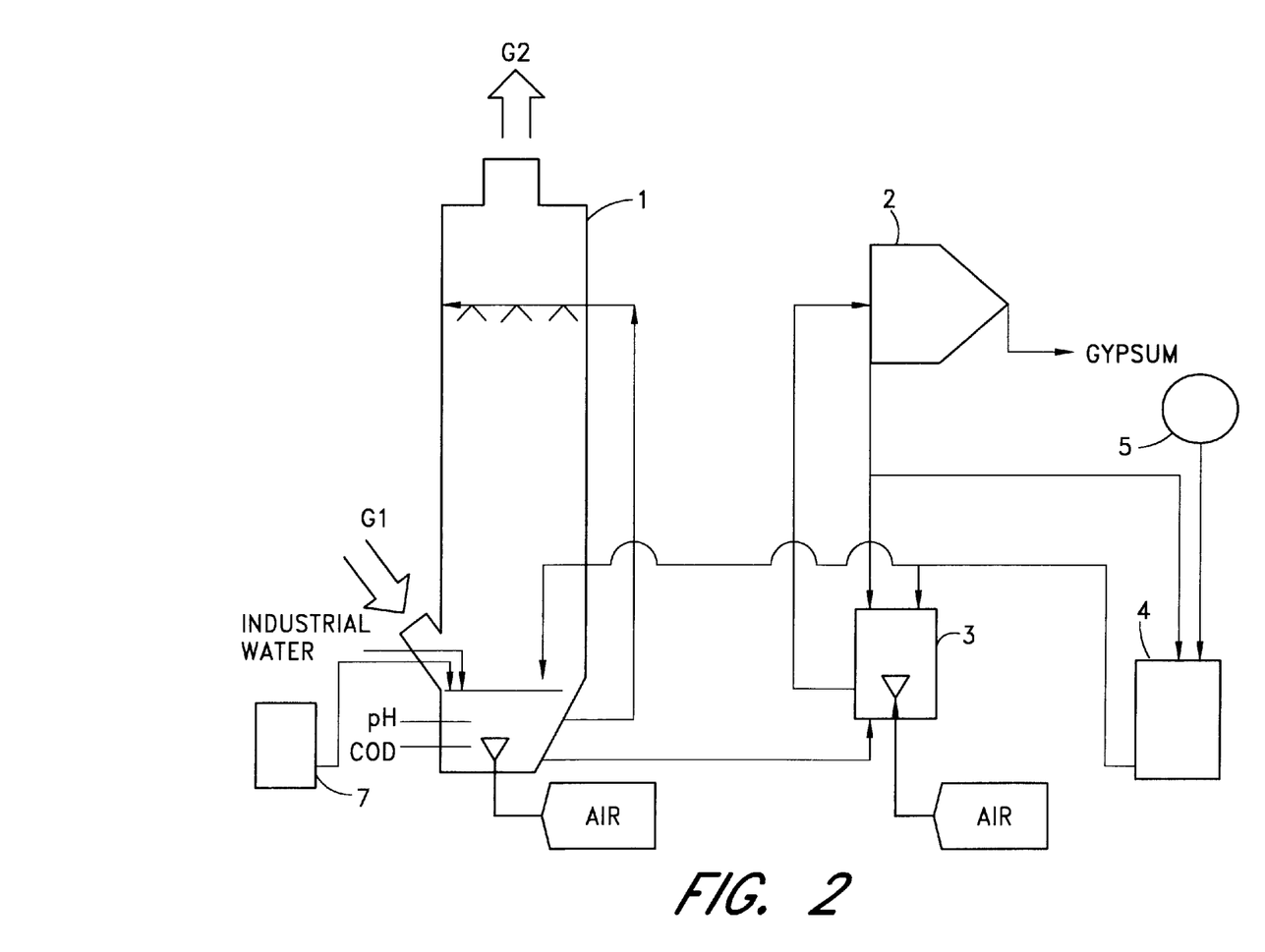
FIG. 2 is a drawing illustrating another example of the present invention.

The principal part of a process for effecting the first invention comprises, as shown in FIGS. 1 and 2, a desulfurization column 1 and magnesium hydroxide slurry feed tank 7 corresponding to the desulfurization step, a gypsum separator 2 corresponding to the gypsum separation step (filter, centrifugal separator, settler, etc. can be used), an oxidation vessel 3 corresponding to the oxidation step, a double decomposition vessel 4 and calcium hydroxide feed tank 5 corresponding to the double decomposition step, and auxiliary pumps and pipings. The desulfurization column 1 is equipped with a pH measuring device and chemical oxygen demand measuring device for a desulfurization-column-absorbing liquid. Here, the chemical oxygen demand (hereinafter abbreviated as COD) is a sum of the concentrations of sulfite ions and bisulfite ions measured by the iodometry and expressed in terms of mg/l as oxygen demand in accordance with JIS K0102-40 (sulfite ion) (Japanese Industrial Standard, K 0102: 1998, Testing Methods for Industrial Wastewater, 40 Sulfite ion, Translated by Japanes Standards Association, 1998). The COD measuring device measures a COD of an object liquid by reading variation of the electrical conductance, etc. of the liquid during titration by the iodometry. If the COD is measured continuously or properly and maintained in the range not exceeding its upper limit value determined depending on the concentration of magnesium sulfate in the absorbing liquid, it is fully possible to achive the object of the present invention, that is, to prevent formation of calcium sulfite. Here, if the concentration of magnesium sulfate in the absorbing liquid varies, the value of COD to be determined depending on the concentration of magnesium sulfate in the absorbing liquid also varies at the same time. Therefore, it is preferable to control the concentration of magnesium sulfate to be constant. Where the process is stable, it is recommended to measure COD once an hour to once a day.

A mixture of magnesium hydroxide and gypsum regenerated in the double decomposition vessel 4 is introduced into the desulfurization column 1, and if necessary, magnesium hydroxide is supplemented from the magnesium hydroxide slurry feed tank 7 to regulate the pH of the absorbing liquid. In the desulfurization column 1, the desulfurization-step-absorbing liquid containing magnesium hydroxide flows down as a slurry in the state of shower and is recycled, so that the liquid is brought into contact with a flue gas G1 containing sulfur dioxide countercurrently or cocurrently to absorb and fix the sulfur dioxide as magnesium sulfite and magnesium bisulfite.

$$Mg(OH)_2 + SO_2 = MgSO_3 + H_2O \tag{1}$$

$$MgSO_3 + SO_2 + H_2O = Mg(HSO_3)_2 \tag{2}$$

$$Mg(HSO_3)_2 + Mg(OH)_2 = 2MgSO_3 + 2H_2O \tag{3}$$

A desulfurization-step-treated liquid is sent to the oxidation vessel 3 by a pump and oxidized with air to convert the magnesium sulfite and magnesium bisulfite to easily soluble magnesium sulfate and sulfuric acid. The sulfuric acid thus formed further reacts with magnesium hydroxide supplied for the purpose of pH regulation to convert to magnesium sulfate.

$$MgSO_3 + 1/2 O_2 = MgSO_4 \tag{4}$$

$$Mg(HSO_3)_2 + O_2 = MgSO_4 + H_2SO_4 \tag{5}$$

$$H_2SO_4 + Mg(OH)_2 = MgSO_4 + 2H_2O \tag{6}$$

An oxygen-containing gas (air or oxygen-enriched air may be used, but usually air is used) is simultaneously blown into the desulfurization column 1 at its bottom so that part of the magnesium sulfite and magnesium bisulfite formed according to the foregoing reaction equations (1), (2) and (3) is oxidized in the desulfurization column 1 to convert them into easily soluble magnesium sulfate, as is the case with the reactions in the oxidation vessel 3. This operation is particularly necessary where the concentration of sulfur dioxide in the flue gas is high.

The liquid treated in the oxidation vessel 3 is sent to the double decomposition vessel 4 where it is reacted with calcium hydroxide supplied from the calcium hydroxide feed tank 5, so that magnesium sulfate contained in the liquid is converted to magnesium hydroxide and gypsum which are recycled to the desulfurization column 1 again.

$$MgSO_4 + Ca(OH)_2 + 2H_2O = Mg(OH)_2 + CaSO_4 \cdot 2H_2O \tag{7}$$

Part of the desulfurization-step-treated liquid is drawn out by a pump (not shown in the drawing) to the gypsum separator 2 where it is separated into gypsum and a liquid which is returned to the desulfurization column 1. The amount of the treated liquid taken out by the pump is so determined that the amount of gypsum in the treated liquid may correspond to the amount of gypsum formed in the double decomposition vessel 4 and introduced into the desulfurization column 1. Under the operating conditions of the desulfurization column 1, the concentrations of magnesium sulfite and magnesium bisulfite formed are maintained below their solubilities, and hence suspended materials in the desulfurization-step-absorbing liquid are generally only gypsum. In FIG. 1, gypsum is taken out of the system by means of the desulfurization-step-treated liquid. However, it is also possible to send a part of the oxidation-step-treated liquid directly to the gypsum separator where gypsum is taken out of the system (FIG. 2). Further, these two process schemes may also be combined.

Because magnesium hydroxide regenerated in the double decomposition vessel 4 is returned to the desulfurization column 1 without separating it from gypsum formed simultaneously, the desulfurization-step-absorbing liquid is a mixed solution of magnesium hydroxide, gypsum, magnesium sulfite and magnesium bisulfite which are reaction products of magnesium hydroxide and sulfur dioxide contained in the flue gas, sulfuric acid and magnesium sulfate. Further, when air is blown into the absorbing liquid to convert the magnesium sulfite and magnesium bisulfite to magnesium sulfate, pH of the treated liquid is reduced due to by-produced sulfuric acid so that the solubility of gypsum is increased to increase the concentration of calcium ions in the treated liquid. Calcium sulfite is lower in solubility than gypsum and therefore it is possible to form and precipitate calcium sulfite from calcium ions and sulfite ions in the absorbing liquid, depending on the conditions of pH and COD of the absorbing liquid.

The formation of calcium sulfite obstructs significantly the crystallinity and quality of gypsum. In order to operate the apparatus stably and continuously, it is necessary to maintain the filtering properties of gypsum in a good condition and, for this purpose, to prevent the deposition of calcium sulfite. The optimum ranges of pH and COD, in which the formation of calcium sulfite is prevented and the desulfurization rate is not impaired, are as shown in FIG. 5.

Figure 5:
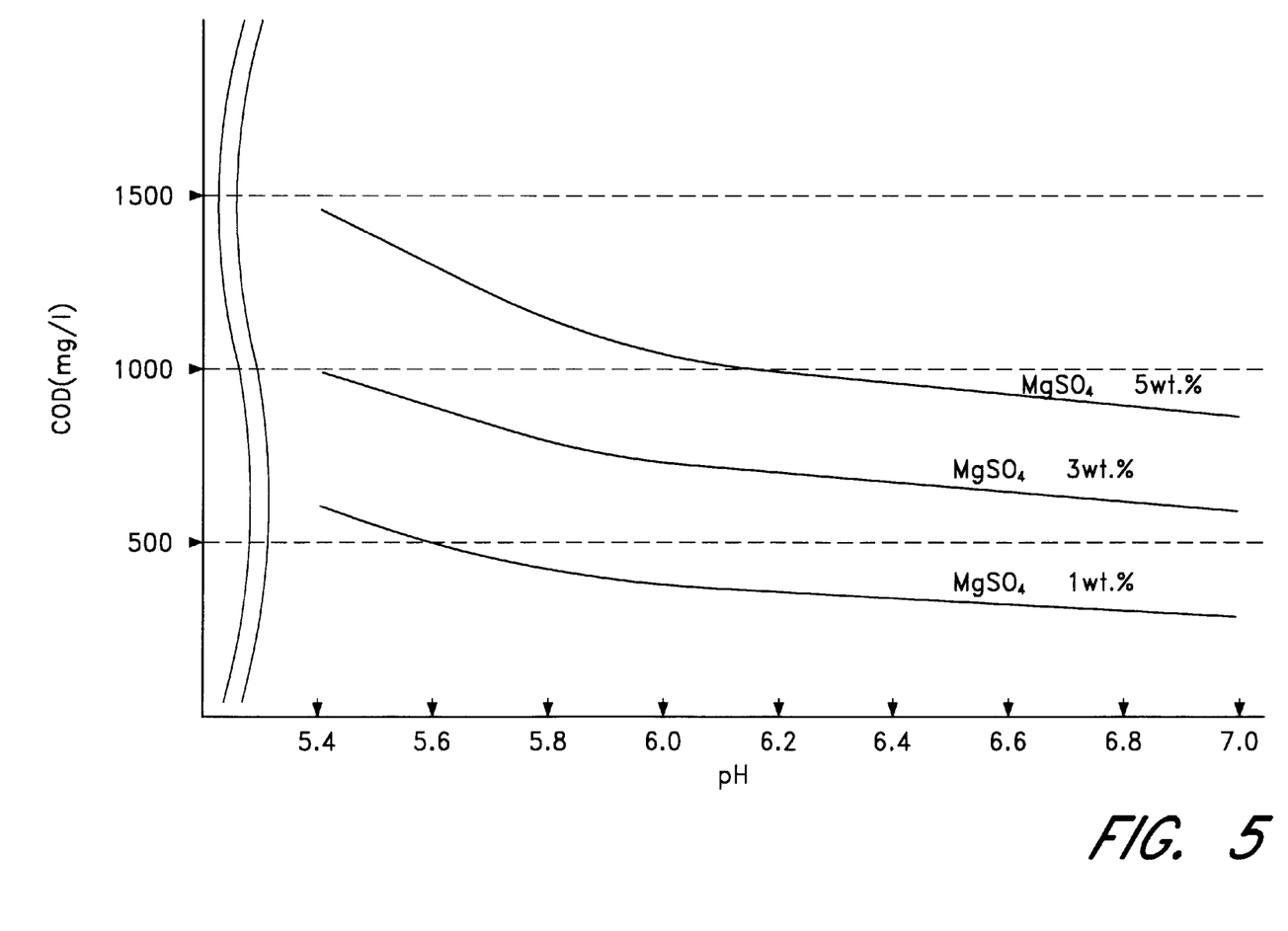
FIG. 5 is a drawing illustrating the optimum values of pH and chemical oxygen demand of the desulfurization-step-absorbing liquid.

Namely, in order to prevent the formation of calcium sulfite, it is necessary to maintain the pH of the desulfurization-step-absorbing liquid at 5.5–7.0 and the COD thereof at 1,500 mg/l or less where the concentration of magnesium sulfate is 5% by weight and at 600 mg/l or less where it is 1% by weight depending on the concentration of magnesium sulfate in the absorbing liquid as shown in FIG. 5. FIG. 5 shows COD in the state of gypsum being saturated. Below the COD determined by the concentration of magnesium sulfate as shown in FIG. 5, no formation of calcium sulfite due to the saturated gypsum will occur.

Both sulfite ions and bisulfite ions are expressed combinedly as a COD, but bisulfite ions have no capability of absorbing sulfur dioxide although sulfite ions have an ability of absorbing sulfur dioxide as shown in the equation (2). Sulfite ions and bisulfite ions are in equilibrium with each other, bisulfite ions being predominant where the pH is low while sulfite ions are predominant where the pH is high. The cause of a low pH lies in the increase of $HSO_3^-$. (It also includes the change of $HSO_3^-$ to sulfuric acid by oxidation.) Therefore, it is not preferable in the absorption of sulfur dioxide that the pH is too low.

If the pH is lower than 5.5, the amounts of magnesium hydroxide and magnesium sulfite are reduced in the desulfurization-step-absorbing liquid, and the rate of desulfurization is unfavorably decreased. If the pH is higher than 7.0, it becomes difficult to control COD due to simultaneous absorption of carbon dioxide. If the COD is less than 100 mg/l, the desulfurization performance is worsened unless the circulating amount of the desulfurization-step-absorbing liquid is increased, while if the COD is more than 1,500 mg/l, the amount of calcium sulfite is increased in gypsum to impair the quality of the gypsum, and at the same time the crystallinity of the gypsum is obstructed to deposit fine crystals that make filtration and dewatering difficult. Where the concentration of sulfur dioxide in a flue gas introduced into the desulfurization column is extremely low (for instance, 300 ppm or less), the COD sometimes becomes 100 mg/l or less depending on the concentration of sulfur dioxide in the flue gas and the material balance between the sulfur dioxide and the desulfurization-step-absorbing liquid. However, 100 mg/l may be allowed where no decrease in the desulfurization performance occurs.

As shown in FIG. 5, the allowable ranges of pH and COD of the desulfurization-step-absorbing liquid vary with the concentration of magnesium sulfate in the absorbing liquid. The COD is indicated as an upper limit value in its allowable range relative to the concentration of magnesium sulfate. Although the concentration of magnesium sulfate may be regulated in the range of 1–10% by weight, it generally requlates 3–8% by weight. Since a preset value of COD is determined by the concentration of magnesium sulfate, it becomes easy to control the COD by keeping the concentration of magnesium sulfate constant.

Factors for varying the pH, magnesium sulfate concentration and COD of the desulfurization-step-absorbing liquid include the amount of sulfur dioxide in a flue gas, the amount of magnesium hydroxide recycled from the double decomposition step, the amount of make-up magnesium hydroxide, the amount of air to be blown, the amount of the absorbing liquid to be withdrawn to the oxidation step, and the like. Under the conditions that these amounts are fixed, the pH, magnesium sulfate concentration and COD of the desulfurization-step-absorbing liquid are in a pseudoequilibrium state.

The concentration of magnesium sulfate in the absorbing liquid is regulated in such a way that the present values of pH and magnesium sulfate concentration of the absorbing liquid are measured, the expected values thereof after a lapse of a certain time being calculated simultaneously from the composition and amount of the flue gas containing sulfur dioxide introduced into the desulfurization step and the amount of the desulfurization-step-treated liquid withdrawn therefrom, and if the expected value of magnesium sulfate concentration is reduced below its present value, (1) the amount of the slurry sent from the oxidation vessel 3 to the double decomposition vessel 4 is reduced;

(2) the amount of the slurry returned to the desulfurization column 1 from the double decomposition vessel 4 is increased; or (3) the amount of magnesium hydroxide supplemented to the desulfurization column is increased. Further, any two or all of (1), (2) and (3) may also be used combinedly. When the concentration of magnesium sulfate is increased in the absorbing liquid, the operation should be reverse to that described above.

The COD in the absorbing liquid is so regulated that the COD of the absorbing liquid is measured first, and if the value is larger than that shown in FIG. 5, (1) the feed volume of the oxygen-containing gas is increased to oxidize sulfite ions and disulfite ions, thereby reducing the COD; or (2) part of the oxidation-step-treated liquid is returned to the desulfurization column to dilute the absorbing liquid, thereby reducing the COD. Further, the foregoing (1) and (2) may also be combined. Where the COD in the absorbing liquid is smaller, the operation should be reverse to that described above.

Where the concentration of sulfur dioxide varies in the flue gas introduced into the desulfurization column 1, the COD of the absorbing liquid is rapidly varied. By referring to the amount and composition of the flue gas introduced into the desulfurization column 1, the amount of magnesium hydroxide slurry, and the amount of the desulfurization-step-absorbing liquid withdrawn, the pH and COD of the absorbing liquid are calculated to estimate their present and future values. In response to the differences from their preset values, the amount of the oxygen-containing gas to be blown and that of the oxidation-step-treated liquid to be returned are changed, so that the variation of pH and COD of the absorbing liquid is prevented.

Regulation of the pH in the absorbing liquid can be effected by increasing the amount of magnesium hydroxide to be supplied where its value is low or by doing a reverse operation where it is too high.

The above-described regulation means for magnesium sulfate concentration, the regulation means for COD, and that for pH are properly combined with each other to maintain both the values in each predetermined range.

Figure 3:
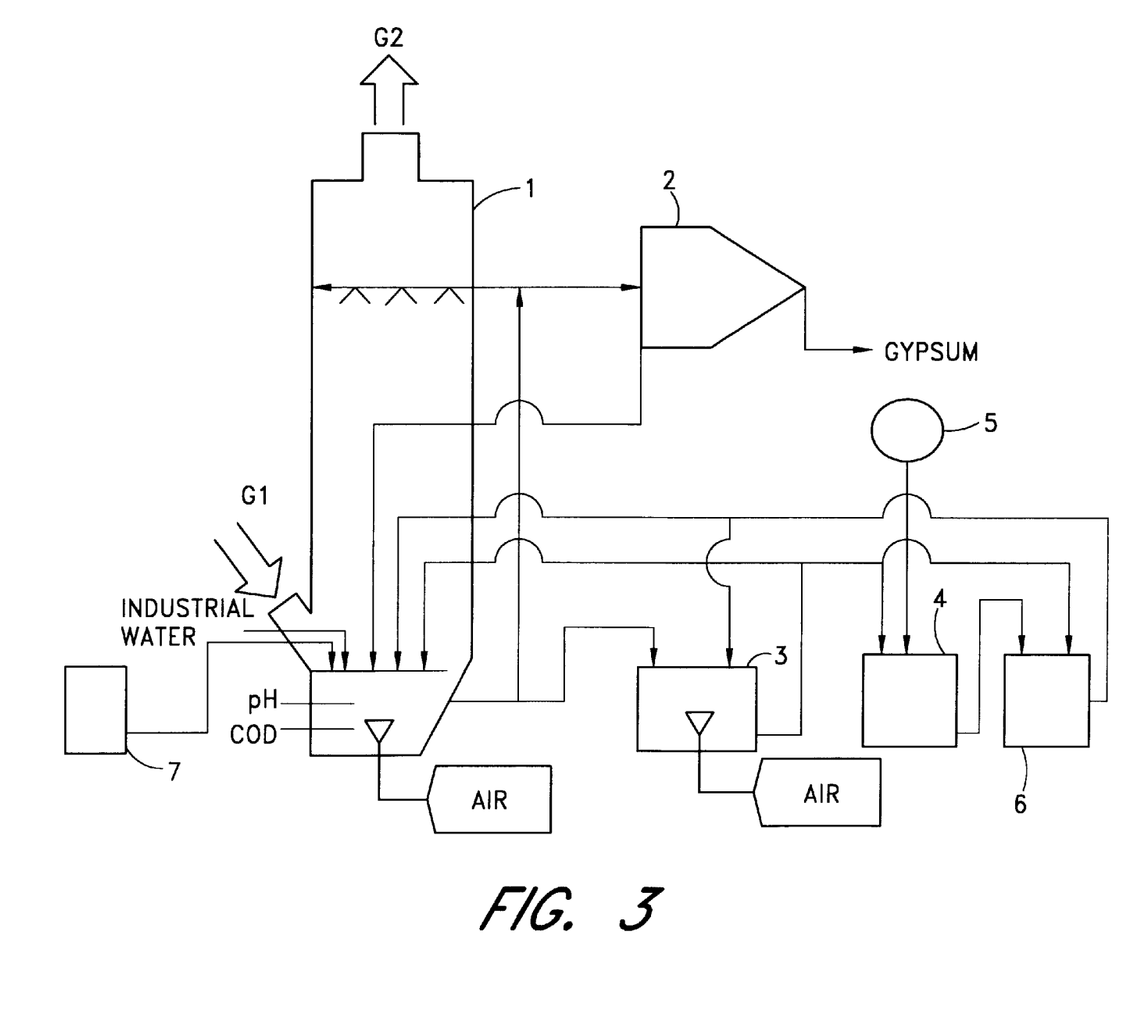
FIG. 3 is a drawing illustrating still another example of the present invention.

In FIG. 3, an example is shown, in which a calcium ion removing vessel 6 is added to the process of FIG. 1. A mixed slurry obtained in the double decomposition vessel 4 of FIG. 1 is introduced into the calcium ion removing vessel 6, to which a part of either or both of a desulfurization-step-treated liquid and an oxidation-step-treated liquid is added to decrease the solubility of gypsum by magnesium sulfate contained therein and thereby to reduce calcium ions in the solution. Thereafter, the resulting mixed slurry is sent to a desulfurization column 1 and an oxidation vessel 3. The desulfurization-step-treated liquid generally contains sulfite ions, creating a possibility of forming insoluble calcium sulfite. Therefore, it is preferable to reduce calcium ions by the addition of a part of the oxidation-step-treated liquid. Others are the same as those of FIG. 1.

Figure 4:
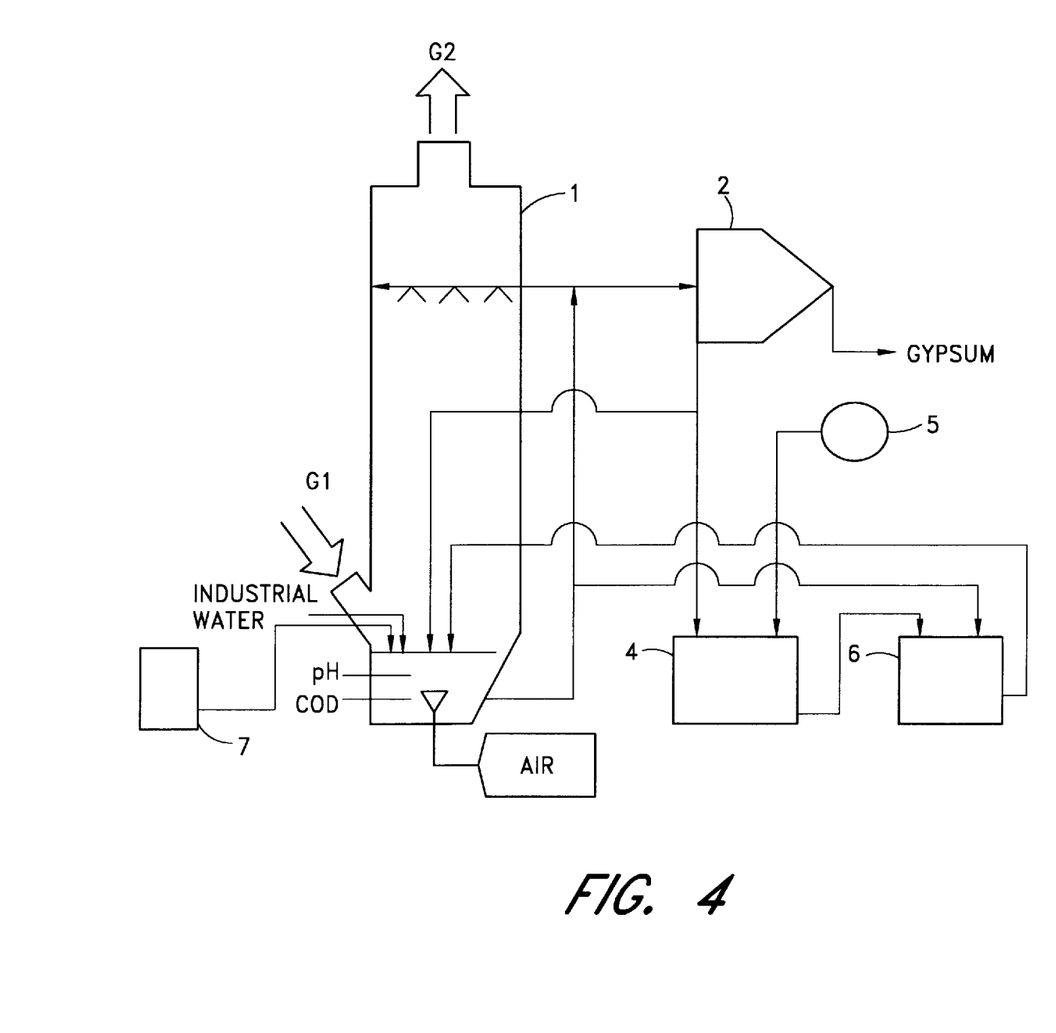
FIG. 4 is a drawing illustrating a further example of the present invention.

FIG. 4 shows an example in which the oxidation vessel is removed from FIG. 3, and this example is applied when the concentration of sulfur dioxide in a flue gas G1 is low. In this case, the COD of a desulfurization-step-absorbing liquid may be less than 100 mg/l in some cases. Oxidations necessary for the reactions of the foregoing formulae (4) and (5) are entirely effected in a desulfurization column and hence the COD of a desulfurization-step-treated liquid may be substantially zero, so that a liquid from a gypsum separator 2 can be sent to either or both of the desulfurization column 1 and a double decomposition vessel 4. A mixed slurry obtained in the double decomposition vessel 4 is introduced into a calcium removing vessel 6, to which a part of a liquid from the desulfurization column 1 or the gypsum separator 2 is added to decrease the solubility of gypsum by sulfate ions contained therein and thereby to reduce calcium ions in the solution. Then, the mixed slurry is sent to the desulfurization column. Others are the same as those of FIG. 3.

Figure 6:
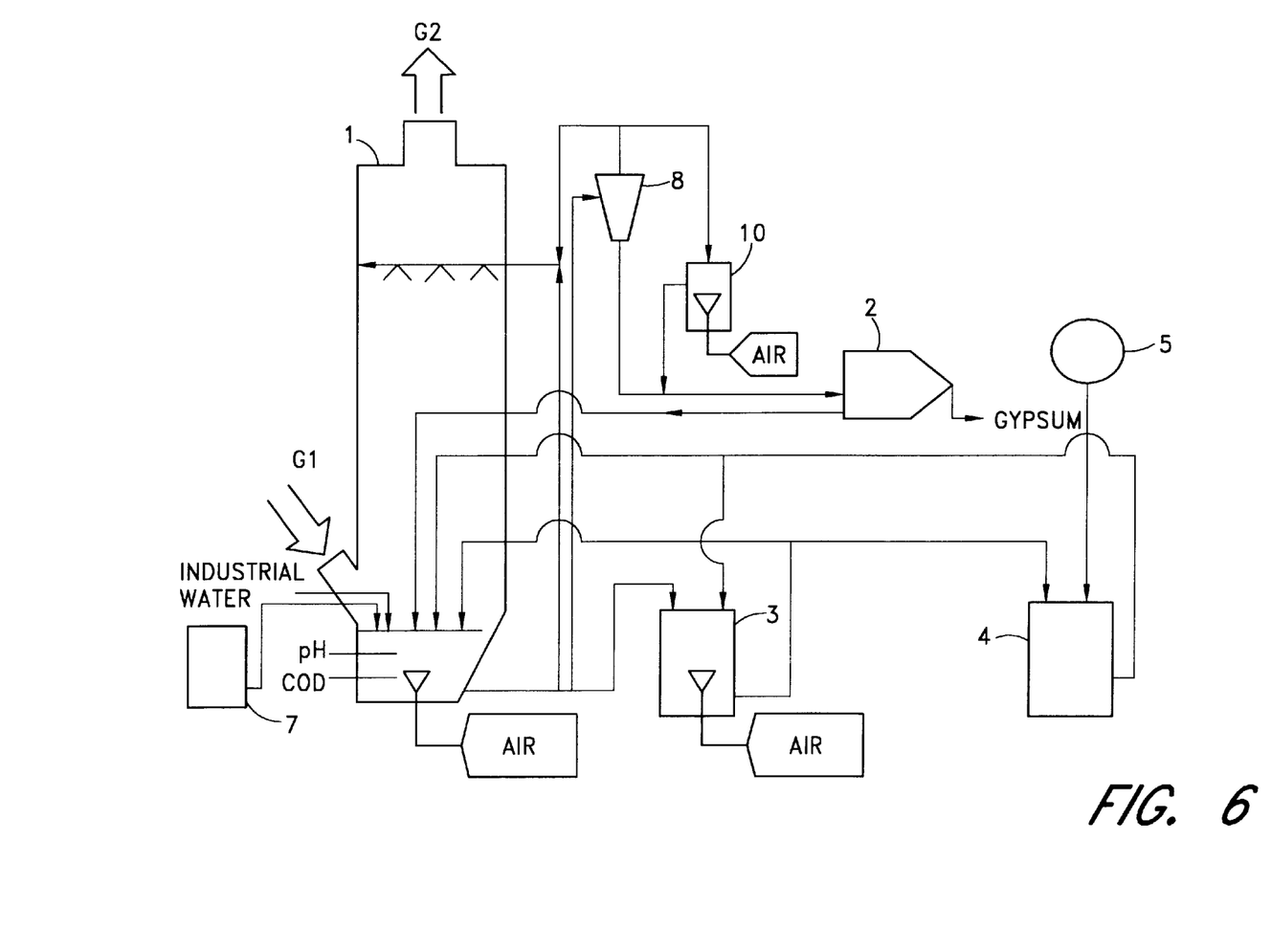
FIG. 6 is a drawing illustrating a still further example of the present invention.

In the following, the second invention is illustrated based on FIG. 6 showing an embodiment of the second invention.

The principal part of a process for effecting the second invention comprises, as shown in FIG. 6, a desulfurization column 1 and magnesium hydroxide slurry feed tank 7 corresponding to the desulfurization step, an oxidation vessel 3 corresponding to the oxidation step, a double decomposition vessel 4 and calcium hydroxide feed tank 5 corresponding to the double decomposition step, a wet separator 8, second oxidation vessel 10 and gypsum separator 2 constituting a gypsum separation system, and auxiliary pumps and pipings.

Since the desulfurization mechanism is as illustrated in the first invention, the gypsum separation system, a gist of the second invention, is described below.

Part of a desulfurization-step-treated liquid is withdrawn by a pump (not shown in the drawing) and sent to the wet separator 8 where it is divided into a coarse particle slurry and a fine particle slurry. The greater part of the fine particle slurry is recycled again to the desulfurization column, and a small part of the remaining fine particle slurry is sent to the second oxidation vessel 10 where it is subjected to oxidation with air so that calcium sulfite contained therein is oxidized to gypsum and the growth of gypsum present as fine particles is promoted. The amount of the fine particle slurry sent to the second oxidation vessel is determined in accordance with the amount of calcium sulfite formed in the desulfurization column. The coarse particle slurry from the wet separator 8, together with a treated liquid from the second oxidation vessel 10, is sent to the gypsum separator 2, where it is separated into gypsum and a remaining solution which is recycled to the desulfurization column. By this gypsum separation system, accumulation of fine gypsum and calcium sulfite within the process can be prevented.

Under the operating conditions of the desulfurization column 1, the concentrations of magnesium sulfite and magnesium bisulfite formed are maintained below their solubilities so that the suspended material in the desulfurization-step-absorbing liquid is generally only gypsum, as is the case with the first invention. The absorbing liquid is a mixed solution of magnesium sulfite, magnesium bisulfite, sulfuric acid and magnesium sulfate. When air is blown into the liquid to convert the magnesium sulfite and magnesium bisulfite to magnesium sulfate, pH of the treated liquid is decreased due to by-produced sulfuric acid, and the solubility of gypsum is increased to increase the concentration of calcium ions in the treated liquid. Since calcium sulfite is lower in solubility than gypsum, there is a possibility of precipitating calcium sulfite formed from calcium ions and sulfite ions in the absorbing liquid, depending on the conditions of pH and sulfite ion concentration in the treated liquid. The accumulation of calcium sulfite is prevented by the above-described means. At the same time, even if there is a tendency of crystalline particles of gypsum becoming finer in the course of operation, gypsum crystals in the system grow and their particle size is increased by discharging part of the crystalline particles to the outside of the system.

In the second invention, it is also possible to introduce a mixed slurry obtained in the double decomposition vessel 4 into a calcium ion removing vessel 6, add a part of an oxidation-step-treated liquid thereto to decrease the solubility of gypsum by magnesium sulfate contained in the liquid and thereby to reduce calcium ions in the solution, and return the resultant mixed slurry to the desulfurization column 1, in the same manner as in the first invention.

Further, where the amount of sulfur dioxide contained in the flue gas G1 is small, it is also possible to effect the invention without the oxidation vessel 3.

Next, the third invention is illustrated with reference to a drawing. In the third invention, fine gypsum is fed to a double decomposition vessel 4 as seed crystals to improve the properties of by-produced gypsum. Here, the amount of gypsum in a desulfurization-step-treated liquid or oxidation-step-treatd liquid sent to the double decomposition vessel 4 is maintained in a predetermined range of amount needed as seed crystals. Since the third invention can be effected by adding it to the first invention or the second invention, it is illustrated based on FIG. 1.

Since the desulfurization mechanism is as illustrated in the first invention, there is described below a gist of the third invention, namely, a method of controlling the concentration of gypsum in the slurry sent to the double decomposition vessel 4.

The amount of gypsum in the slurry sent to the double decomposition vessel 4 is 20%–80%, preferably 30%–70%, based on the amount of gypsum formed in the double decomposition vessel 4. If the amount of gypsum sent to the double decomposition vessel 4 is more than 80%, the number of seed crystals becomes excessively large so that fine crystals are unfavorably separated out instead. On the other hand, if it is less than 20%, no effects are expected in promoting crystal growth.

The amount of magnesium sulfate sent to the double decomposition vessel 4 is fixed in the equilibrium state and its concentration is also fixed. Under this state, in order to maintain the amount of gypsum in the gypsum slurry sent to the double decomposition vessel 4 in the predetermined range based on the gypsum formed in the double decomposition vessel 4, it is necessary to control the concentration of gypsum in the slurry sent to the double decomposition vessel 4. To this end, the flow rate of the desulfurization-step-treated liquid or oxidation-step-treated liquid sent to the gypsum separator 4 is regulated, that is, the amount of gypsum sent to the gypsum separator 2 is controlled. For example, if the amount of gypsum sent to the gypsum separator 2 is increased, the concentration of gypsum in the slurry is reduced.

A part of the desulfurization-step-treated liquid is drawn out by a pump (not shown in the drawing) and sent to the gypsum separator 2 where it is separated into gypsum and a remaining liquid. The remaining liquid from the gypsum separator 2 is accompanied by fine crystals of gypsum which have not been separated. The fine gypsum is returned to the desulfurization column 1 and then sent via the oxidation vessel 3 to the double decomposition vesel 4, where it works as seed crystals so as to grow markedly the crystals of gypsum formed in the double decomposition vessel 4 and prevent the formation of muddy gypsum occurring in the course of continued operation. The markedly grown gypsum is removed in the gypsum separator 2 while the fine gypsum is sent to the double decomposition vessel 4 as seed crystals.

In FIG. 1, although gypsum is drawn out of the system by means of the desulfurization-step-treated liquid, a part of the oxidation-step-treated liquid may be directly sent to the gypsum separator 2 for the withdrawal of gypsum (FIG. 2). Further, the withdrawal may be effected by means of both the treated liquids.

In the third invention, it is also possible to introduce a mixed slurry obtained in the double decomposition vessel 4 to a calcium ion removing vessel 6, where a part of the oxidation-step-treated liquid is added to the slurry to reduce the solubility of gypsum by magnesium sulfate contained in the liquid and thereby to reduce calcium ions in the solution, and return the resultant mixed slurry to the desulfurization column 1, as is the case with the first and second inventions.

Further, where the amount of sulfur dioxide contained in the flue gas is small, it is also possible to effect the invention without the oxidation vessel 3.

The desulfurization process for a flue gas according to the present invention is described in more detail by the following examples with reference to the drawings.

EXAMPLE 1

An experiment was carried out in the apparatus shown in FIG. 1. An absorbing liquid, in which magnesium hydroxide and gypsum particles were suspended, was caused to flow down in the state of shower at a rate of 21,000 l/h from the upper part of a desulfurization column and brought into contact with a flue gas G1 containing sulfur dioxide introduced at the lower part thereof. Thus, the sulfur dioxid were absorbed and fixed in the absorbing liquid as magnesium sulfite, magnesium disulfite, etc., and a treated gas G2 with the sulfur dioxide removed was discharged to the outside of the column at its top.

The flue gas fed to the desulfurization column was cooled by spraying it with industrial water through a nozzle because the temperature of the gas was high. The flow rate of the flue gas introduced was 3,000 $Nm^3$ (wet)/hr and the concentration of sulfur dioxide was 500 ppm.

The desulfurization-step-absorbing liquid, which had flowed down to the bottom of the desulfurization column 1 and absorbed the sulfur dioxide, was sent to the upper part of the desulfurization column, together with a magnesium hydroxide slurry supplied newly from a magnesium hydroxide slurry feed tank 7, and caused to flow down through the column. This operation was repeated so as to circulate the absorbing liquid continuously through the desulfurization column. A part of the treated liquid from the desulfurization column 1 was introduced into a gypsum separator 2 at a rate of 300 l/hr, and gypsum suspended in the treated liquid was separated there and discharged at a rate of 11 kg/hr to the outside of the system, while the remaining liquid was returned to the desulfurization column. 250 l/hr of a mixed slurry comprising magnesium hydroxide and gypsum obtained in a double decomposition vessel 4 was recycled to the desulfurization column 1 to maintain the pH of the absorbing liquid at 6.2, and 200 l/hr of the desulfurization-step-treated liquid was fed to an oxidation vessel 3 from the desulfurization column 1.

The concentration of gypsum slurry in the desulfurization-step-treated liquid supplied to the oxidation vessel 3 was 4% by weight, and the amount of the gypsum was 70% based on the gypsum formed in the double decomposition vessel 4. Air in a volume of 20 $Nm^3$/hr was blown into the bottom of the desulfurization column to maintain the COD at 700 mg/l. The pH was measured continuously by a pH meter, while the COD was measured by the iodometry for an absorbing liquid sample taken out once an hour.

The temperature of the absorbing liquid in the desulfurization column was 52° C., and as the salt concentration, a total amount of sulfur expressed in terms of magnesium sulfate was 4% by weight. The concentration of sulfur dioxide in the treated gas G2 was 20 ppm, and the desulfurization rate was 96%.

200 l/hr of a desulfurization-step-treated liquid, fed to the oxidation vessel 3 from the desulfurization column 1, was aerated for oxidation to form an aqueous solution of 4% by weight of magnesium sulfate and a small amount of sulfuric acid. The pH in the oxidation vessel 3 was set at about 6.2 by the addition of a slurry from the double decomposition vessel 4. The oxidation-step-treated liquid was fed to the double decomposition vessel 4 at a rate of 200 l/hr. An aqueous slurry containing 10% by weight of calcium hydroxide was fed to the double decomposition vessel 4 from a calcium hydroxide feed tank 5 so that the pH in the double decomposition vessel 4 was controlled to be 10.5 to react magnesium sulfate with calcium hydroxide while stirring/mixing them by an agitator. Thus, solid particles of gypsum and magnesium hydroxide were formed. The reaction temperature was about 50° C.

The mixed slurry of magnesium hydroxide and gypsum obtained in the double decomposition vessel 4 was re turned to the desulfurization column 1 and the oxidation vessel 3.

The gypsum obtained in this example had good filtering properties and hence the content of calcium sulfite in the gypsum was to a negligible extent.

EXAMPLE 2

An experiment was carried out in the apparatus shown in FIG. 2.

An absorbing liquid, in which magnesium hydroxide and gypsum particles were suspended, was caused to flow down in the state of shower at a rate of 21,000 l/hr from the upper part of a desulfurization column and brought into contact with a flue gas G1 containing sulfur dioxide introduced at the lower part thereof. Thus, the sulfur dioxide were absorbed and fixed in the absorbing liquid as magnesium sulfite, magnesium disulfite, etc., and a treated gas G2 with the sulfur dioxide removed was discharged to the outside of the column at its top.

The flue gas fed to the desulfurization column was cooled by spraying it with industrial water through a nozzle because the temperature of the gas was high. The flow rate of the flue gas introduced was 3,000 $Nm^3$ (wet)/hr and the concentration of sulfur dioxide was 500 ppm.

The desulfurization-step-absorbing liquid, which had flowed down to the bottom of the desulfurization column 1 and absorbed the sulfur dioxide, was sent to the upper part of the desulfurization column, together with a magnesium hydroxide slurry supplied newly from a magnesium hydroxide slurry feed tank 7, and caused to flow down through the column. This operation was repeated so as to circulate the absorbing liquid continuously through the desulfurization column. 250 l/hr of a mixed slurry treated in the below-described double decomposition vessel 4 was returned to the desulfurization column to maintain the pH of the absorbing liquid at 6.2. Air in a volume of 20 $Nm^3$/hr was blown into the bottom of the desulfurization column to maintain the COD at 700 mg/l. The pH was measured continuously by a pH meter, while the COD was measured by the iodometry for an absorbing liquid sample taken out once an hour.

The temperature of the absorbing liquid in the desulfurization column was 52° C., and as the salt concentration, a total amount of sulfur expressed in terms of magnesium sulfate was 4% by weight. The concentration of sulfur dioxide in the treated gas G2 was 20 ppm, and the desulfurization rate was 96%.

200 l/hr of a desulfurization-step-treated liquid was supplied from the desulfurization column 1 to an oxidation vessel 3, where it was aerated for oxidation to form an aqueous solution of 4% by weight of magnesium sulfate and a small amount of sulfuric acid. The pH in the oxidation vessel 3 was set at about 6.2 by the addition of a slurry from the double decomposition vessel 4. A part of the liquid treated in the oxidation vessel 3 in an amount of 300 l/hr was introduced into a gypsum separator 2, where gypsum suspended in the treated liquid was separated from the liquid and discharged to the outside of the system at a rate of 11 kg/hr. Further, the treated liquid of the oxidation vessel 3 from which gypsum had been separated was fed to the double decomposition vessel 4 at a rate of 200 l/hr. An aqueous slurry containing 10% by weight of calcium hydroxide was fed to the double decomposition vessel 4 from a calcium hydroxide feed tank 5 so that the pH in the double decomposition vessel was controlled to be 10.5 to react magnesium sulfate with calcium hydroxide while stirring/mixing them by an agitator. Thus, solid particles of gypsum and magnesium hydroxide were formed. The reaction temperature was about 50° C.

The mixed slurry of magnesium hydroxide and gypsum obtained in the double decomposition vessel 4 was returned to the oxidation vessel 3 and the desulfurization column 1 as described above.

The gypsum obtained in this example had good filtering properties, and the content of calcium sulfite in the gypsum was to a negligible extent.

EXAMPLE 3

An experiment was carried out in an apparatus having a dotted line part in the apparatus shown in FIG. 1.

An absorbing liquid, in which magnesium hydroxide and gypsum particles were suspended, was caused to flow down in the state of shower at a rate of 21,000 l/hr from the upper part of a desulfurization column 1 and brought into contact with a flue gas G1 containing sulfur dioxide introduced at the lower part thereof. Thus, the sulfur dioxide were absorbed and fixed in the absorbing liquid as magnesium sulfite, magnesium bisulfite, etc., and a treated gas G2 with the sulfur dioxide removed was discharged to the outside of the column at its top part.

The flue gas fed to the desulfurization column 1 was cooled by spraying it with industrial water through a nozzle because the temperature of the gas was high. The flow rate of the flue gas introduced was 3,000 $Nm^3$ (wet)/hr, and the concentration of sulfur dioxide was 500 ppm.

The desulfurization-step-absorbing liquid, which had flowed down to the bottom of the desulfurization column 1 and absorbed the sulfur dioxide, was sent to the upper part of the desulfurization column, together with a magnesium hydroxide slurry supplied newly from a magnesium hydroxide slurry feed tank 7, and caused to flow down through the column. This operation was repeated so as to circulate the absorbing liquid continuously through the desulfurization column. A part of the treated liquid from the desulfurization column 1 was introduced into a gypsum separator 2 at a rate of 600 l/hr, and gypsum suspended in the treated liquid was separated there and discharged at a rate of 11 kg/hr to the outside of the system, while the remaining liquid was returned to the desulfurization column 1.

250 l/hr of a mixed slurry comprising magnesium sulfate and gypsum obtained in a double decomposition vessel 4 was recycled to the desulfurization column 1 to maintain the pH of the absorbing liquid at 6.2, and 400 l/hr of the desulfurization-step-treated liquid was fed to the oxidation vessel 3 from the desulfurization column 1. The concentration of gypsum slurry in the desulfurization-step-treated liquid supplied to the oxidation vessel 3 was about 2% by weight, and the amount of the gypsum was about 30% based on the amount of the gypsum formed in the double decomposition vessel 4. Air in a volume of 16 $Nm^3$/hr was blown into the bottom of the desulfurization column to maintain the COD at 700 mg/l, and 200 l/hr of the oxidation-step-treated liquid was fed thereto. The pH was measured continuously by a pH meter, while the COD was measured by the iodometry for an absorbing liquid sample taken once an hour.

The temperature of the absorbing liquid in the desulfurization column was 52° C., and as the salt concentration, a total amount of sulfur expressed in terms of magnesium sulfate was 4% by weight. The concentration of sulfur dioxide in the treated gas G2 was 20 ppm and the desulfurization rate was 96%.

400 l/hr of the desulfurization-step-treated liquid, fed to the oxidation vessel 3 from the desulfurization column 1, was aerated for oxidation to form an aqueous solution of 4% by weight of magnesium sulfate and a small amount of sulfuric acid. The pH in the oxidation vessel 3 was set at about 6.2 by the addition of a slurry from the double decomposition vessel. The oxidation-step-treated liquid was fed to the double decomposition vessel 4 at a rate of 200 l/hr. An aqueous slurry containing 10% by weight of calcium hydroxide was fed to the double decomposition vessel 4 from a calcium hydroxide feed tank 5, so that the pH in the double decomposition vessel 4 was controlled to be 10.5 to react magnesium sulfate with calcium hydroxide while stirring/mixing them by an agitator. Thus, solid particles of gypsum and magnesium hydroxide were formed. The reaction temperature was 50° C.

The mixed slurry of magnesium hydroxide and gypsum obtained in the double decomposition vessel 4 was returned to the desulfurization column 1 and the oxidation vessel 3.

The gypsum obtained in this example had good filtering properties and hence the content of calcium sulfite in the gypsum was to a negligible extent. Further, the crystals of gypsum did not turn into mud by long term operation.

EXAMPLE 4

An experiment was carried out in the same manner as in Example 3 in the apparatus shown in FIG. 1.

The flow rate of the flue gas fed to the desulfurization column 1 was changed to 1,500 $Nm^3$ (wet)/hr. Here, the flow rate of the flue gas and the values of sulfur dioxide concentration in the inlet flue gas (G1) and the treated gas (G2) of the desulfurization column were measured and recorded by a computor, in which a calculation was made from the amount of sulfur dioxide absorbed in the desulfurization column to regulate the amount of the liquid sent from the oxidation vessel 3 to the double decomposition vessel 4 so that the concentration of magnesium sulfate in the absorbing liquid might become 4% by weight. As regards the COD of the absorbing liquid, a method of controlling COD in the absorbing liquid was previously stipulated also from the amount of sulfur dioxide absorbed, and a program was incorporated in the computor to regulate the amount of the liquid recycled from the oxidation vessel 3 to the desulfurization column 1 from the COD thus controlled. In accordance with the change of the amount of the flue gas introduced, the amount of the liquid sent from the oxidation vessel 3 to the double decomposition vessel 4 was regulated from 200 l/hr to 100 l/hr by an operation by the computor. At the same time, the amount of the liquid recycled from the oxidation vessel 3 to the desulfurization column 1 was regulated, the variation of the liquid level in the oxidation vessel 3 being controlled by a controller, and the amount of the liquid sent from the desulfurization column 1 to the oxidation vessel 3 was automatically regulated. The amount of the slurry sent from the double decomposition vessel 4 to the desulfurization column 1 was controlled by an automatic controller so that the pH of the absorbing liquid might become 6.2.

After an hour, the concentration of magnesium sulfate in the oxidation-step-treated liquid was analyzed to be about 4% by weight, and the operation continued normally.

EXAMPLE 5

An experiment was carried out in the apparatus shown in FIG. 3.

The apparatus of FIG. 3 is an example in which a calcium ion removing vessel 6 is added to the apparatus of FIG. 1. The fundamental conditions are the same as those of Example 1, and therefore only the difference owing to the provision of the calcium ion removing vessel 6 in the downstream of a double decomposition vessel 4 is described.

A mixed slurry of magnesium hydroxide and gypsum from the double decomposition vessel 4 was sent to the calcium ion removing vessel 6 where a part of the oxidation-step-treated liquid was added to the slurry at a rate of 80 l/hr and stirred and mixed uniformly by an agitator, so that the concentration of calcium ions dissolved to the level of the solubility of gypsum in the treated liquid was reduced by the coexistence of magnesium sulfate in the treated liquid.

The properties of gypsum obtained in this example were equivalent to those of gypsum obtained in Example 1.

EXAMPLE 6

An experiment was carried out in the apparatus shown in FIG. 4.

The apparatus of FIG. 4 is an example in which the oxidation vessel 3 was removed from the apparatus of FIG. 3. The fundamental conditions are the same as those of Example 1, except that the amount of the flue gas introduced was changed to 2,000 $Nm^3$(wet)/hr.

A desulfurization-step-absorbing liquid, which had flowed down to the bottom of a desulfurization column 1 and absorbed sulfur dioxide, was sent to the upper part of the desulfurization column, together with a magnesium hydroxide slurry supplied newly from a magnesium hydroxide slurry feed tank 7, and caused to flow down through the column. This operation was repeated so as to circulate the absorbing liquid continuously through the desulfurization column. A part of the treated liquid from the desulfurization column 1 was introduced into a gypsum separator 2 at a rate of 200 l/hr, and gypsum suspended in the treated liquid was separated there and discharged at a rate of 8 kg/hr to the outside of the system, while the remaining liquid was sent to a double decomposition vessel 4. 250 l of a mixed slurry comprising magnesium hydroxide and gypsum obtained in the double decomposition vessel 4 was recycled to the desulfurization column 1 via the calcium ion removing vessel 6 to maintain the pH of the absorbing liquid at 6.2, and 20 $Nm^3$/hr of air was blown into the desulfurization column to maintain the COD at 50 mg/l. The pH was measured continuously by a pH meter, and the COD was measured by the iodometry for an absorbing liquid sample taken once an hour.

The temperature of the absorbing liquid in the desulfurization column was 50° C., and as the salt concentration, a total amount of sulfur expressed in terms of magnesium sulfate was 3% by weight. The concentration of sulfur dioxide in the treated gas G2 was 20 ppm and the desulfurization rate was 96%.

An aqueous slurry containing 10% by weight of calcium hydroxide was fed to the double decomposition vessel 4 from a calcium hydroxide feed tank 5 so that the pH in the double decomposition vessel 4 was controlled to be 10.5 to react magnesium sulfate with calcium hydroxide while stirring/mixing them by an agitator. Thus, solid particles of gypsum and magnesium hydroxide were formed. The reaction temperature was 50° C.

The mixed slurry of magnesium hydroxide and gypsum from the double decomposition vessel 4 was sent to the calcium ion removing vessel 6 where a part of the desulfurization-step-treated liquid was added to the slurry at a rate of 70 l/hr and stirred and mixed uniformly by an agitator, so that the concentration of calcium ions dissolved to the level of the solubility of gypsum in the treated liquid was reduced by the coexistence of magnesium sulfate in the treated liquid.

The mixed slurry of magnesium hydroxide and gypsum with its calcium ion concentration reduced in the calcium ion removing vessel 6 was returned to the desulfurization column.

The properties of gypsum obtained in this example were the same as those of gypsum obtained in Example 1.

EXAMPLE 7

An experiment was carried out in the apparatus shown in FIG. 6.

An absorbing liquid, in which magnesium hydroxide and gypsum particles are suspended, was caused to flow down in the state of shower at a rate of 21,000 l/hr from the upper part of an desulfurization column and brought into contact with a flue gas G1 containing sulfur dioxide introduced at the bottom part thereof. Thus, the sulfur dioxide were absorbed and fixed in the absorbing liquid as magnesium sulfite, magnesium bisulfite, etc., and a gas G2 with the sulfur oxides removed was discharged to the outside of the column at its top part.

The flue gas fed to the desulfurization column 1 was cooled by spraying it with industrial water through a nozzle because the temperature of the gas was high. The flow rate of the flue gas introduced was 3,000 $Nm^3$(wet)/hr and the concentration of sulfur dioxide was 500 ppm.

The desulfurization-step-absorbing liquid, which had flowed down to the bottom of the desulfurization column 1 and absorbed the sulfur dioxide, was sent to the upper part of the desulfurization column, together with a magnesium hydroxide slurry supplied newly from a magnesium hydroxide slurry feed tank 7, and caused to flow down through the column. This operation was repeated so as to circulate the absorbing liquid continuously through the desulfurization column. A part of the treated liquid from the desulfurization column 1 was introduced into a gypsum separation system at a rate of 300 l/hr. The treated liquid was first sent to a wet separator 8 where 30 l/hr of a coarse particle slurry was withdrawn at its bottom and 270 l/hr of a fine particle slurry was taken out at its top. 250 l/hr of the fine particle slurry was directly sent to the desulfurization column 1 where it was caused to flow down in the state of shower as a desulfurization-step-absorbing liquid, the rest of the fine particle slurry being sent to a second oxidation vessel 10 where 2 $Nm^3$/hr of air was blown into the slurry to oxidize calcium sulfite contained therein to gypsum. The second oxidation vessel had a temperature of 50° C. and a pH of 4.0–4.5. At the same time, fine gypsum particles in the fine particle slurry were grown there. The coarse particle slurry from the wet separator 8, combined with the treated liquid from the second oxidation vessel 10, was introduced into a gypsum separator 2 to obtain 11 kg/hr of gypsum and about 40 l/hr of a remaining liquid. The remaining liquid was returned to the desulfurization column 1 as a desulfurzation-step-absorbing liquid.

To the desulfurization column 1 was returned 250 l/hr of a mixed slurry of magnesium hydroxide and gypsum obtained in the double decomposition vessel 4 to maintain the pH of the absorbing liquid at 6.2, and 200 l/hr of the desulfurization-step-treated liquid was fed from the desulfurization column 1 to an oxidation vessel. To maintain the COD at 700 mg/l, air was blown into the bottom of the desulfurization column at a rate of 20 $Nm^3$/hr.

The temperature of the absorbing liquid in the desulfurization column was 52° C., and as the salt concentration, a total amount of sulfur expressed in terms of magnesium sulfate was 4% by weight. The concentration of sulfur dioxide in the treated gas G2 was 20 ppm and the rate of desulfurization was 96%.

200 l/hr of the treated liquid fed to the oxidation vessel 3 from the desulfurization column 1 was aerated there for oxidation to obtain an aqueous solution of 4% by weight of magnesium sulfate and a small amount of sulfuric acid. The pH in the oxidation vessel 3 was regulated at about 6.2 by the addition of the slurry from the double decomposition vessel 4. The oxidation-step-treated liquid was sent to the double decomposition vessel 4 at a rate of 200 l/hr. A water slurry containing 10% by weight of calcium hydroxide was fed from a calcium hydroxide feed tank 5 to the double decomposition vessel 4 so that the pH in the vessel might be regulated at 10.5. The mixture was stirred and mixed by an agitator to react magnesium sulfate with calcium hydroxide. Thus, solid particles of gypsum and magnesium hydroxide were formed. The reaction temperature was 50° C.

The mixed slurry of magnesium hydroxide and gypsum obtained in the double decomposition column 4 was returned to the desulfurization column 1 and the oxidation vessel 3.

The properties of the gypsum obtained in the present invention were equivalent to those of gypsum obtained in Example 1.

Effects of the Invention

In the first invention, the composition and amount of a flue gas introduced into a desulfurization column, the amount of supplementary magnesium hydroxide, the amount of a slurry recycled from a double decomposition vessel, the amount of a solution sent to an oxidation vessel or the double decomposition vessel, and the amount of air blown into the desulfurization column are so controlled that the pH of a desulfurization-step-absorbing liquid is maintained at 5.5–7.0 and the COD thereof is maintained in a range determined according to the concentration of magnesium sulfate in the absorbing liquid. As a result, the amount of calcium sulfite that accompanies gypsum can be suppressed while maintaining the efficiency of desulfurization. In consequence, the quality of gypsum is improved and its filtration is extremely facilitated.

In the second invention, a fine particle slurry is steadily withdrawn from the desulfurization column so as to remove calcium sulfite formed under the conditions of the desulfurization column and fine gypsum. Accordingly, the size and quality of gypsum particles are improved.

In the third invention, the amount of fine gypsum particles sent to the double decomposition vessel is controlled to an amount in which the particles work most suitably as seed crystals. As a result, the size and quality of gypsum particles are improved.

What is claimed is:

1. A method for removing sulfur dioxide out of a flue gas containing sulfur dioxide, comprising the steps of:

(a) desulfurizing a flue gas containing sulfur dioxide by contacting the flue gas with a desulfurizing liquid containing magnesium components in a desulfurization column, wherein the sulfur dioxide is absorbed, in the form of magnesium salts including magnesium sulfite and magnesium bisulfite, by the desulfurizing liquid;

(b) oxidizing with an oxygen-containing gas the desulfurization reaction liquid containing magnesium salts discharged from the desulfurization column, in an oxidation vessel, wherein the magnesium salts are converted to magnesium sulfate and sulfuric acids;

(c) neutralizing with a basic calcium compound in a double decomposition vessel the oxidized liquid containing the magnesium sulfate and sulfuric acid discharged from the oxidation vessel, wherein gypsum and magnesium hydroxide are formed in the oxidized liquid which is in the form of a slurry;

(d) recycling the slurry containing gypsum and magnesium hydroxide to the desulfurization and optionally to the oxidation vessel, wherein the magnesium hydroxide is used as a desulfurizing agent in step (a), wherein the desulfurization reaction liquid comprises magnesium hydroxide, gypsum, magnesium sulfite, magnesium bisufite, sulfuric acid, and magnesium sulfate, wherein sulfite ions and calcium ions are present;

(e) separating gypsum from at least either the desulfurization reaction liquid discharged from the desulfurization column or the oxidized liquid discharged from the oxidation vessel; and (f) measuring the flow and composition of the flue gas introduced into the desulfurization column in step (a) and the flow of the desulfurization reaction liquid discharged from the desulfurization column to estimate subsequent values of pH and magnesium sulfate concentration of the desulfurization reaction liquid in the desulfurization column;

(g) comparing the estimated subsequent values with predetermined constant target values to determine discrepancies; and (h) conducting at least one of (i), (ii), or (iii) to minimize the discrepancies:
  (i) controlling the flow of the slurry in step (c) fed to the double decomposition vessel;
  (ii) controlling the flow of the recycling slurry in step (d);
  (iii) adding magnesium hydroxide to the desulfurization column in step (a).

2. The method as claimed in claim 1 wherein the amount of gypsum in the oxidized liquid sent to the double decomposition step is from 20% to 80% of the gypsum formed in the double decomposition step.

3. The method as claimed in claim 1 wherein the amount of gypsum taken out in the gypsum separation step from the desulfurization-step-treated and/or oxidation-step-treated liquid is controlled to regulate the concentration of gypsum in the oxidized liquid sent to the double decomposition step.

4. The method as claimed in claim 1, further comprising a calcium ion reduction step provided after the double decomposition step, wherein a part of the oxidation-step-treated liquid is added to the mixed slurry of magnesium hydroxide and gypsum generated in the double decomposition step in a vessel to reduce the concentration of calcium ions in said mixed slurry by magnesium sulfate contained in the treated liquid, the resulting mixture being returned to the desulfurization step and/or oxidation step.

5. A method for removing sulfur dioxide out of a flue gas containing sulfur dioxide, comprising the steps of:

(a) desulfurizing a flue gas containing sulfur dioxide by contacting the flue gas with a desulfurizing liquid containing magnesium components in a desulfurization column, wherein the sulfur dioxide is absorbed in the form of magnesium salts by the desulfurizing liquid;

(b) oxidizing with an oxygen-containing gas in an oxidation vessel the desulfurization reaction liquid obtained in step (a), wherein magnesium sulfate is generated from the magnesium salts present in the desulfurization reaction liquid;

(c) neutralizing with a basic calcium compound in a double decomposition vessel the oxidized liquid containing the magnesium sulfate obtained in step (b), wherein gypsum and magnesium hydroxide are formed in the oxidized liquid which is in the form of a slurry;

(d) recycling the slurry containing gypsum and magnesium hydroxide to the desulfurization column and optionally to the oxidation vessel, wherein the magnesium hydroxide is used as a desulfurizing agent in step (a);

(e) separating gypsum from at least either the desulfurization reaction liquid discharged from the desulfurization column or the oxidized liquid discharged from the oxidation vessel;

(f) measuring the pH, the chemical oxygen demand (COD), and the magnesium sulfate concentration of the desulfurization reaction liquid; and (g) maintaining the pH in the range of 5.5–7 and the COD in a range not exceeding an upper limit determined by the magnesium sulfate concentration to prevent formation of calcium sulfite in the desulfurization reaction liquid, wherein the relationship between the pH and the upper limit of the COD at the magnesium sulfate concentration is predetermined.

6. The method as in claim 5 wherein the amount of gypsum in the oxidized liquid sent to the double decomposition step is from 20% to 80% of the gypsum formed in the double decomposition step.

7. The method as claimed in claim 5 wherein the amount of gypsum taken out in the gypsum separation step from the desulfurization-step-treated and/or oxidation-step-treated liquid is controlled to regulate the concentration of gypsum in the oxidized liquid sent to the double decomposition step.

8. The method as claimed in claim 5, further comprising a calcium ion reduction step provided after the double decomposition step, wherein a part of the oxidation-step-treated liquid is added to the mixed slurry of magnesium hydroxide and gypsum generated in the double decomposition step in a vessel to reduce the concentration of calcium ions in said mixed slurry by magnesium sulfate contained in the treated liquid, the resulting mixture being returned to the desulfurization step and/or oxidation step.

9. The method as claimed in claim 5 wherein said desulfurization column also acts as said oxidation vessel.

10. The method according to claim 5, wherein the pH and the COD are maintained in step (g) by conducting at least either (i) or (ii):
  (i) blowing an oxygen-containing gas into the desulfurization column;
  (ii) recycling a portion of the slurry discharged from the oxidation vessel to the desulfurization column.

11. The method according to claim 5, wherein the pH and the magnesium sulfate concentration are maintained in step (g) by conducting at least one of (i), (ii), or (iii):
  (i) controlling the flow of the slurry formed in step (c) fed to the double decomposition vessel;
  (ii) controlling the flow of the recycling slurry in step (d);
  (iii) adding magnesium hydroxide to the desulfurization column in step (a).

12. The method according to claim 5, further comprising, between steps (f) and (g), the steps of:

measuring the flow and composition of the flue gas introduced into the desulfurization column in step (a) and the flow of the desulfurization reaction liquid discharged from the desulfurization column to estimate subsequent values of pH and COD of the desulfurization reaction liquid in the desulfurization column; and comparing the estimated subsequent values with predetermined constant target values to determine discrepancies, wherein the pH and the COD are maintained in step (g) by conducting at least either (i) or (ii) to minimize the discrepancies:

(i) blowing an oxygen-containing gas into the desulfurrization column;

(ii) recycling a portion of the slurry discharged from the oxidation vessel to the desulfurization column.

13. The method according to claim 5, further comprising, between steps (f) and (g), the steps of:

measuring the flow and composition of the flue gas introduced into the desulfurization column in step (a) and the flow of the desulfurization reaction liquid discharged from the desulfurization column to estimate subsequent values of pH and magnesium sulfate concentration of the desulfurization reaction liquid in the desulfurization column; and comparing the estimated subsequent values with predetermined constant target values to determine discrepancies, wherein the pH and the magnesium sulfate concentration are maintained in step (g) by conducting at least either one of (i), (ii), or (iii) to minimize the discrepancies::

(i) controlling the flow of the slurry in step (c) fed to the double decomposition vessel;

(ii) controlling the flow of the recycling slurry in step (d);

(iii) adding magnesium hydroxide to the desulfurization column in step (a).

14. A method for removing sulfur dioxide out of a flue gas containing sulfur dioxide, comprising the steps of:

(a) desulfurizing a flue gas containing sulfur dioxide by contacting the flue gas with a desulfurizing liquid containing magnesium components in a desulfurization column, wherein the sulfur dioxide is absorbed, in the form of magnesium salts including magnesium sulfite and magnesium bisulfite, by the desulfurizing liquid;

(b) oxidizing with an oxygen-containing gas the desulfurization reaction liquid containing magnesium salts discharged from the desulfurization column, in an oxidation vessel, wherein the magnesium salts are converted to magnesium sulfate and sulfuric acids;

(c) neutralizing with a basic calcium compound in a double decomposition vessel the oxidized liquid containing the magnesium sulfate and sulfuric acid discharged from the oxidation vessel, wherein gypsum and magnesium hydroxide are formed in the oxidized liquid which is in the form of a slurry;

(d) recycling the slurry containing gypsum and magnesium hydroxide to the desulfurization column and optionally to the oxidation vessel, wherein the magnesium hydroxide is used as a desulfurizing agent in step (a), wherein the desulfurization reaction liquid comprises magnesium hydroxide, gypsum, magnesium sulfite, magnesium bisufite, sulfuric acid, and magnesium sulfate, wherein sulfite ions and calcium ions are present;

(e) causing the flow of the desulfurization reaction liquid from the desulfurization column to branch off to a wet separator to separate the liquid into a coarse-particle slurry and a fine-particle slurry;

(f) separating the fine-particle slurry into a first flow and a second flow, said first flow being returned to the desulfurization column, said second flow being directed to a second oxidation vessel to oxidize calcium sulfite present in the fine-particle slurry to gypsum and promote the crystalline growth of fine particles of gypsum in the second oxidation vessel;

(g) directing the liquid discharged from the second oxidation vessel and the coarse-particle slurry to a gypsum separator to separate gypsum and the remaining liquid; and (h) returning said remaining liquid to the desulfurization column.

15. The method as claimed in claim 14 wherein the amount of gypsum in the oxidized liquid sent to the double decomposition step is from 20% to 80% of the gypsum formed in the double decomposition step.

16. The method as claimed in claim 14, further comprising a calcium ion reduction step provided after the double decomposition step, wherein a part of the oxidation-step-treated liquid is added to the mixed slurry of magnesium hydroxide and gypsum generated in the double decomposition step in a vessel to reduce the concentration of calcium ions in said mixed slurry by magnesium sulfate contained in the treated liquid, the resulting mixture being returned to the desulfurization step and/or oxidation step.

* * * * *